Aug. 20, 1946.                    J. S. ALSPAUGH                    2,406,184
                                   TRANSMISSION
                                Filed Aug. 14, 1944
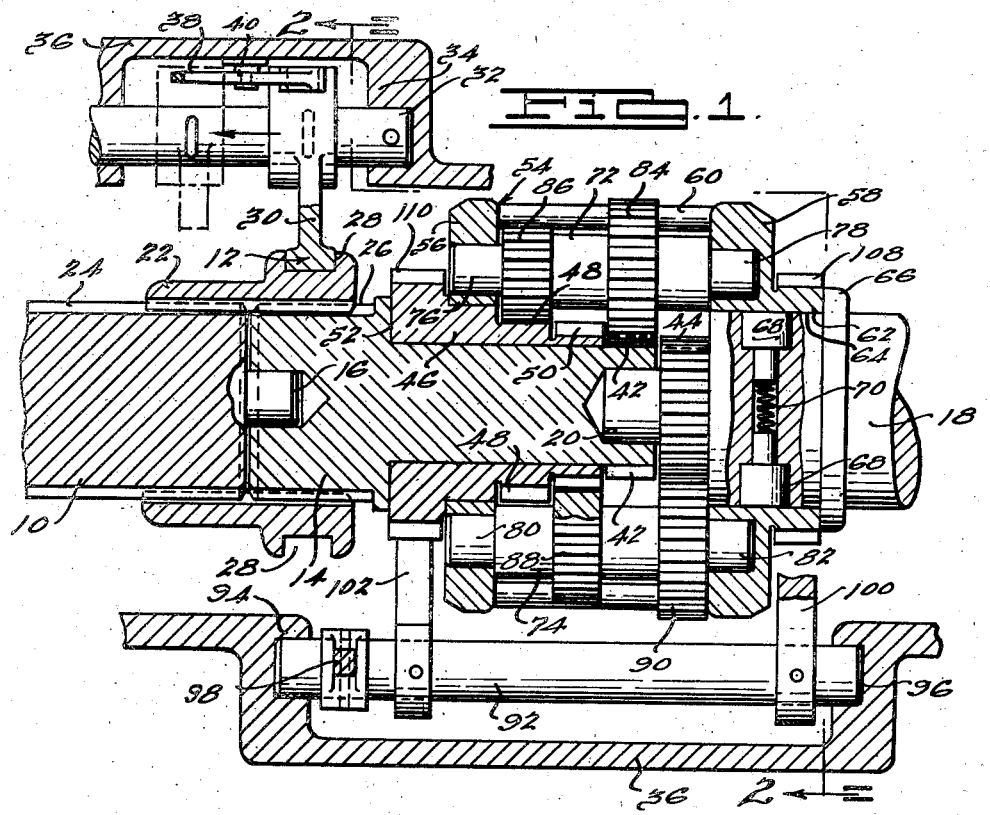
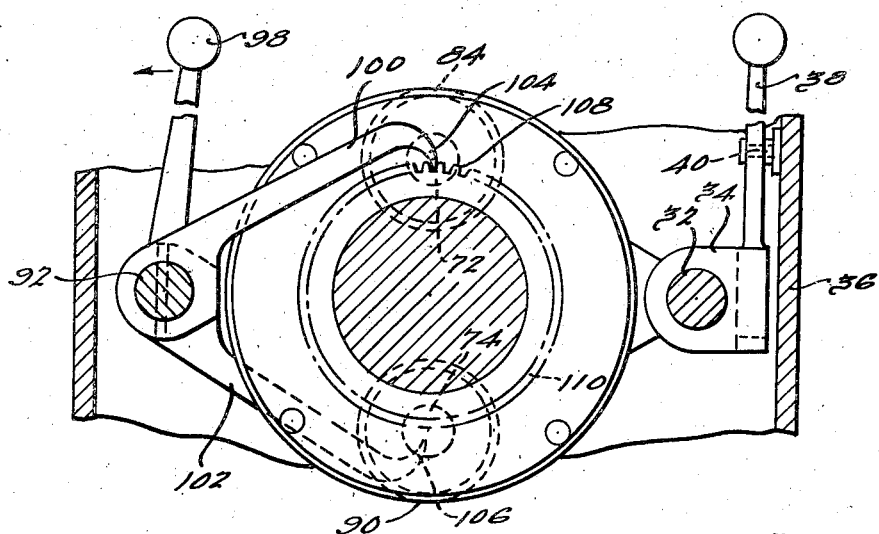
INVENTOR.
James S. Alspaugh.
BY
ATTORNEY Patented Aug. 20, 1946

2,406,184

UNITED STATES PATENT OFFICE 2,406,184

TRANSMISSION

James Shellenbarger Alspaugh, Portsmouth, Ohio

Application August 14, 1944, Serial No. 549,342

2 Claims. (Cl. 74—271)

This invention relates to transmissions and more particularly to a mechanical device for transmitting power from a driving shaft to a driven shaft in such a manner that the speed and torque ratios of the driven shaft relative to the driving shaft are dependent on the ratios of the power applied to the driving shaft with reference to the load to which the driven shaft is subjected.

An object of this invention is therefore to provide a mechanical transmission having driving and driven shafts interconnected by mechanical gearing adapted to be controlled or locked in such a manner that the ratios of speed and torque may vary in proportion to variations of the power and loads exerted on the driving and driven shafts.

A further object of the invention resides in the provision of a mechanical transmission having aligned driving and driven shafts interconnected by planetary gearing rotatably mounted in a frame carried by the driving and driven shafts in such a manner that the frame may move relative to a stationary member to vary the torque and speed ratios of the driving and driven shafts.

Yet another object of the invention is to provide a mechanical gear transmission having a sun gear carrier interposed between and interconnecting driving and driven shafts through planetary gearing in such a manner that the sun gear carrier or the planetary gearing may be locked against rotation or controlled as to rotational speed to vary the speed and torque ratio of the transmission of power from the driving shaft to the driven shaft.

A further object of the invention is to provide a transmission having spaced selectively operable gear members to vary the torque and speed ratios of the transmission of power from a driving shaft to a driven shaft.

Still another object resides in the provision of a transmission having gear-connected shafts wherein means are provided for controlling the speed of rotation of gear carriers and gears to vary the power transmitting characteristics of the transmission.

Another object of the invention resides in the provision of a simple yet rugged mechanical gear transmission for efficiently transferring power from a driving shaft to a driven shaft in accordance with variations of load between the driving and driven shafts to provide an efficient mechanical gear transmission.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a longitudinal sectional view of a transmission embodying the present invention.

Fig. 2 is a fragmentary sectional view on a somewhat reduced scale, taken substantially on the line 2—2 of Fig. 1 looking in the direction of the arrows.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

A power shaft 10 adapted to be driven by any suitable source of power is connected through a clutching mechanism 12 with a driving shaft 14 journalled therein as by means of a pilot 16. The driving shaft 14 is also aligned with a driven shaft 18 journalled therein by the pilot as illustrated at 20.

The clutching mechanism 12 consists of a sleeve 22 having internal splines to engage external splines 24 and 26 formed in the power and driving shafts 10 and 14 respectively. The splines 24 on the power shaft 10 are of sufficient length to accommodate the entire sleeve 22 thereby completely disengaging the splines 26 on the driving shaft 14.

The sleeve 22 has a groove 28 to receive a yoke 30 slidably mounted on a rod 32 journalled in a boss 34 of the housing 36. The yoke 30 is actuated by a lever 38 pivoted on a projection 40 secured to the housing 36.

The driving shaft 14 is provided with a pinion gear 42 spaced axially from a pinion gear 44 fixed to the driven shaft 18. A sun gear sleeve 46 having spaced sun gears 48 and 50 is rotatably mounted on the driving shaft 14 between the pinion gear 42 fixed to the driving shaft 14 and a radially extended flange 52 also formed on the driving shaft 14.

A planet carrier 54 having spaced flanges 56 and 58 interconnected by suitable frame member 60 is mounted on the sun gear sleeve 46 and driven shaft 18 as illustrated in Fig. 1. The planet carrying flange 56 is provided with an axially extended bushing 62 concentrically mounted on a surface 64 of the driven shaft 18 between a flange 66 and the pinion gear 44 fixed to the driven shaft 18.

Spaced stabilizing members formed of spaced shoes 68 positioned in radially extended slots in the driven shaft 18 are yieldingly urged outwardly by a spring 70 to yieldingly engage the inner surface of the bushing 62 to exert a slight frictional force thereon to damp out oscillations and fluctuations of the drive.

Pinion carriers 72 and 74 having spaced trunnions 76—78 and 80—82 respectively are rotatably mounted in the flanges 56 and 58. The carrier 72 is provided with spaced pinion gears 84 and 86 adapted to mesh with the pinion gear 42 fixed to the driving shaft 14 and to the sun gear 48 carried by the sun gear sleeve 46 respectively. The pinion carrier 74 is provided with pinion gears 88 and 90 meshing with the sun gear 50 carried by the sun gear sleeve 46 and with the pinion gear 44 fixed to the driven shaft 18 respectively.

Means may be provided to lock the sun gear sleeve 46 or the planet carrier 54 against rotation to vary the torque and speed ratios of the drive from the driving shaft 14 to the driven shaft 18.

Any suitable braking mechanism may be employed to control the speed of, or to lock the sun gear sleeve or planet carrier. One desirable form of such braking means includes the rock shaft 92 journalled in spaced bosses 94 and 96 of the frame 36 and actuated by a conveniently located lever 98. The shaft 92 is provided with spaced arms 100 and 102 having actuating portions 104 and 106 adapted to engage gear members 108 and 110 carried by the planet carrier 54 and sun gear sleeve 46 respectively to selectively lock the planet carrier 54 or the sun gear sleeve 46 against rotation to effect the desired variation of the speed and torque transmitting characteristics of the device.

The operation of this device is as follows: When the lever 98 is in the neutral position with the actuating portions 104 and 106 out of engagement with the gears 108 and 110, power applied to the driving shaft 14 is transmitted through the pinion gear 42 to rotate the pinion gear 84 carried by the pinion carrier 72 of the planet carrier 54. Rotation of the pinion gear 84 is transmitted through the pinion gear 86 to rotate the sun gear sleeve 46 concentrically mounted on the driving shaft 14.

If a high gear ratio is desired, the lever 98 is actuated to move the contacting portion 104 of the arm 100 into engagement with the pinion 108 to lock the planet carrier 54 against rotation. Rotation of the driving shaft 14 is then effective through the pinion 42 to rotate the pinion 84 fixed to the pinion carrier 72 about its trunnions 76 and 78. Rotation of the pinion carrier 72 is effective through the pinion 86 engaging the sun gear 48 to rotate the sun gear sleeve 46 about the driving shaft 14. Rotation of the sun gear sleeve 46 is effective through the sun gear 50 to rotate the pinion 88 fixed to the pinion carrier 74 journalled in the trunnions 80 and 82. As this pinion carrier 74 rotates it drives the driven shaft 18 through the pinion gears 90 and 44 at a high gear ratio.

If a lower gear ratio is desired the lever 98 is actuated in the opposite direction to move the contactor portion 106 of the arm 102 into engagement with the pinion 110 to lock the sun gear sleeve 46 against rotation. As the driving shaft 14 rotates within the locked sun gear sleeve 46 the pinion gear 42 fixed to the driving shaft 14 rotates the pinion 84 to rotate the planet carrier 54 around the non-rotating sun gear sleeve 46. Rotation of the planet carrier 54 about the sleeve 46 is effective through the sun gear 48 meshing with the pinion 86 to rotate planet carrier 54. Rotation of this planet carrier 54 is effective through the pinion 90 meshing with the pinion 44 fixed to the driven shaft 18 to rotate the driven shaft at a lower gear ratio.

The gear ratios of the various drives can be varied through wide limits by changing the sizes of the mating gears to provide any desired gear ratio for a particular application.

Braking means of any convenient type may be provided to control the speed of rotation of the planet carrier 54 or the sun gear sleeve 46 to permit progressively varying the gear ratios in either direction. The braking means may be of any desired type such for example as of the friction type wherein the pinion gears 108 and 110 are replaced with smooth metallic brake drums or flanges, and the lever 98 is operable to actuate contracting brake bands to engage the brake drums to control the speed of rotation of the planet or sun gear carriers. When this expedient is resorted to, virtually any desired gear ratio can be established and maintained between the driving and driven shafts, and the ratio may readily be varied whenever necessary to carry the load to which the driven shaft is subjected by the power applied to the driving shaft.

I claim:

1. A transmission comprising driving and driven shafts having axially spaced pinion gears, a sun gear sleeve rotatably mounted on the driving shaft and having two axially spaced sun gears of different diameters, a planet pinion carrier concentrically mounted on the driving and driven shafts, a shaft journalled in the planet pinion carrier, axially spaced pinion gears of different diameters fixed to said shaft and connecting the driving shaft pinion with one of the sun gears of the sun gear sleeve, a second shaft journalled in the planet pinion carrier, axially spaced pinion gears of different diameters fixed to said second shaft and interconnecting the other of said sun gears carried by the sun gear sleeve with the driven shaft pinion, and means to selectively lock the sun gear sleeve or the planet pinion carrier to transmit power from the driving shaft to the driven shaft at varying speed and torque ratios.

2. A power transmission comprising a driving shaft having a pinion gear, a driven shaft having a pinion gear spaced from the pinion gear of the driving shaft, a planet pinion carrier concentrically mounted on the driving and driven shafts, a sun gear sleeve having axially spaced sun gears of different diameters journalled on the driving shaft, connecting means between the driving shaft pinion and one of the sun gears of the sun gear sleeve including pinion gears of different diameters journalled in the planet pinion carrier, connecting means between the driven shaft pinion and the other of the sun gears of the sun gear sleeve including pinion gears of different diameters journalled in the planet pinion carrier, and manually operable means to selectively lock the planet pinion carrier or the sun gear sleeve against rotation to vary the speed and torque ratios of power transmission from the driving shaft to the driven shaft.

JAMES SHELLENBARGER ALSPAUGH.